US012704201B2

(12) United States Patent
Guzzoni

(10) Patent No.: US 12,704,201 B2
(45) Date of Patent: Aug. 11, 2026

(54) OPERATIVE CONNECTION DEVICE

(71) Applicant: TESEO S.R.L., Desenzano del Garda (IT)

(72) Inventor: Paolo Guzzoni, Desenzano del Garda (IT)

(73) Assignee: TESEO S.R.L., Desenzano del Garda (IT)

( * ) Notice: Subject to any disclaimer, the term of this patent is extended or adjusted under 35 U.S.C. 154(b) by 29 days.

(21) Appl. No.: 18/853,395

(22) PCT Filed: Feb. 27, 2023

(86) PCT No.: PCT/IB2023/051808
§ 371 (c)(1),
(2) Date: Oct. 1, 2024

(87) PCT Pub. No.: WO2023/194814
PCT Pub. Date: Oct. 12, 2023

(65) Prior Publication Data

US 2025/0216003 A1 Jul. 3, 2025

(30) Foreign Application Priority Data

Apr. 5, 2022 (IT) ........................ 102022000006707

(51) Int. Cl.
*F16B 7/18* (2006.01)
*F16L 3/00* (2006.01)
(Continued)

(52) U.S. Cl.
CPC ............... *F16L 3/006* (2013.01); *F16L 9/003* (2013.01); *F16L 41/12* (2013.01)

(58) Field of Classification Search
CPC ......... F16L 9/003; F16L 41/12; F16L 41/001; F16L 41/02; F16B 7/18
See application file for complete search history.

(56) References Cited

U.S. PATENT DOCUMENTS 5,697,650 A * 12/1997 Brown .................... F16L 41/12
411/537
6,860,455 B1 * 3/2005 Richardson ............... F16L 3/10
248/74.1

(Continued)

FOREIGN PATENT DOCUMENTS

EP 0767313 A1 4/1997
EP 3561353 A1 10/2019

(Continued)

OTHER PUBLICATIONS

European Patent Office, International Search Report issued in PCT/IB2023/051808, mailed Apr. 24, 2023, Rijswijk, NL.

(Continued)

*Primary Examiner* — Nkeisha Smith
(74) *Attorney, Agent, or Firm* — Ferguson Case Orr Paterson

(57) ABSTRACT

An operative connection device of a connection and fluidic distribution system which extends along an axis has a rigid channel element extending along the axis and having a square section, the rigid channel element having four longitudinal surfaces provided with operative holes, and at least one bracket element for engaging and securing the rigid channel element to a support wall. The bracket element has a base member engageable with the support wall and a gripping member having two member ends engaged with the base member and a housing region in which the rigid channel element is accommodated. The gripping member is shaped so that the housing region has a substantially complementary shape to the square section of the rigid channel element, so that two of the four longitudinal surfaces are positioned facing the support wall and the other two of the four longitudinal surfaces are positioned facing an environment.

19 Claims, 7 Drawing Sheets

(51) Int. Cl.
*F16L 9/00* (2006.01)
*F16L 41/12* (2006.01)

(56) References Cited

U.S. PATENT DOCUMENTS

| | | | | |
|---|---|---|---|---|
| 7,014,213 | B1 * | 3/2006 | Kaiser | F16L 9/003 285/130.1 |
| 2005/0212293 | A1 * | 9/2005 | Matt | F16L 21/08 285/414 |
| 2010/0193060 | A1 * | 8/2010 | McCarthy | F16L 3/127 285/182 |

FOREIGN PATENT DOCUMENTS

| | | | |
|---|---|---|---|
| FR | 2663400 | A3 | 12/1991 |
| KR | 101743654 | B1 | 6/2017 |

OTHER PUBLICATIONS

European Patent Office, International Written Opinion issued in PCT/IB2023/051808, mailed Apr. 24, 2023, R.
Italian Patent Office, Italian Search Report issued in 202200006707, mailed Oct. 25, 2022.

* cited by examiner 202
22
6
250
3
4
5
250
250
25
250
20
3
6
26
250
5
26
26
200
201
21
1
4

OPERATIVE CONNECTION DEVICE

CROSS-REFERENCE TO RELATED APPLICATIONS

This application is a National Phase Application of PCT International Application No. PCT/IB2023/051808, having an International Filing Date of Feb. 27, 2023 which claims the benefit of priority to Italian Patent Application No. 102022000006707, filed Apr. 5, 2022, each of which is hereby incorporated by reference in its entirety.

FIELD OF THE INVENTION

The present invention relates to an operative connection device of a connection and fluidic distribution system.

BACKGROUND OF THE INVENTION

Typically, connection and fluidic distribution systems are used within working environments, for example in the workstations of an assembly line. Such connection and fluidic distribution systems are used to supply pneumatically operated instruments, such as screwdrivers and/or inserters. Such connection and fluidic distribution systems are used to supply the same workstations or specific portions of the workstations, which in turn are considerable as pneumatically operated instruments.

Known connection and fluidic distribution systems comprise one or more rigid channels, for example in a line or in a ring, through which pressurized air flows. The term “air” refers to all types of gases or technical fluids, such as nitrogen, argon, mixtures of CO2, or similar, or industrial oils and the emulsions thereof. The term “pressurized air” refers to both positive pressure and negative pressure (that is, in depression/vacuum).

Such connection and distribution systems are intended to convey the pneumatic supply to said pneumatically operated instruments.

Moreover, it is known said rigid channels are arranged within raised regions, in such a way as to limit any encumbrance within the operative working regions.

In the prior art, in order to connect the channels to pneumatically operated instruments, specific connection groups extending vertically from above are used. Said connecting elements are also known in Italian jargon as “droppers”.

A typical problem with said connection groups is that of having complex, and above all inconvenient, modes of connection for the working means. In particular, this problem is mainly found at the terminal portions of said connection groups.

Sometimes two connection groups are arranged, one carrying pressurized air and one carrying air under negative pressure.

Sometimes, both a connection group for the supply of compressed air and a connection group for the supply of a cooling water-oil emulsion for a cutting tool are arranged, for example, in a machine or a workstation.

SUMMARY OF THE INVENTION

The object of the present invention is to provide an operative connection device that is suitable for satisfying the requirements of the specific sector, thereby resolving the aforementioned problem.

This object is achieved by an operative connection device as described and claimed herein. Preferred embodiment variants involving further advantageous aspects are also described.

BRIEF DESCRIPTION OF THE DRAWINGS

The object of the present invention is described in detail hereinafter, with the help of the accompanying drawings, wherein.

DETAILED DESCRIPTION

Figure 1:
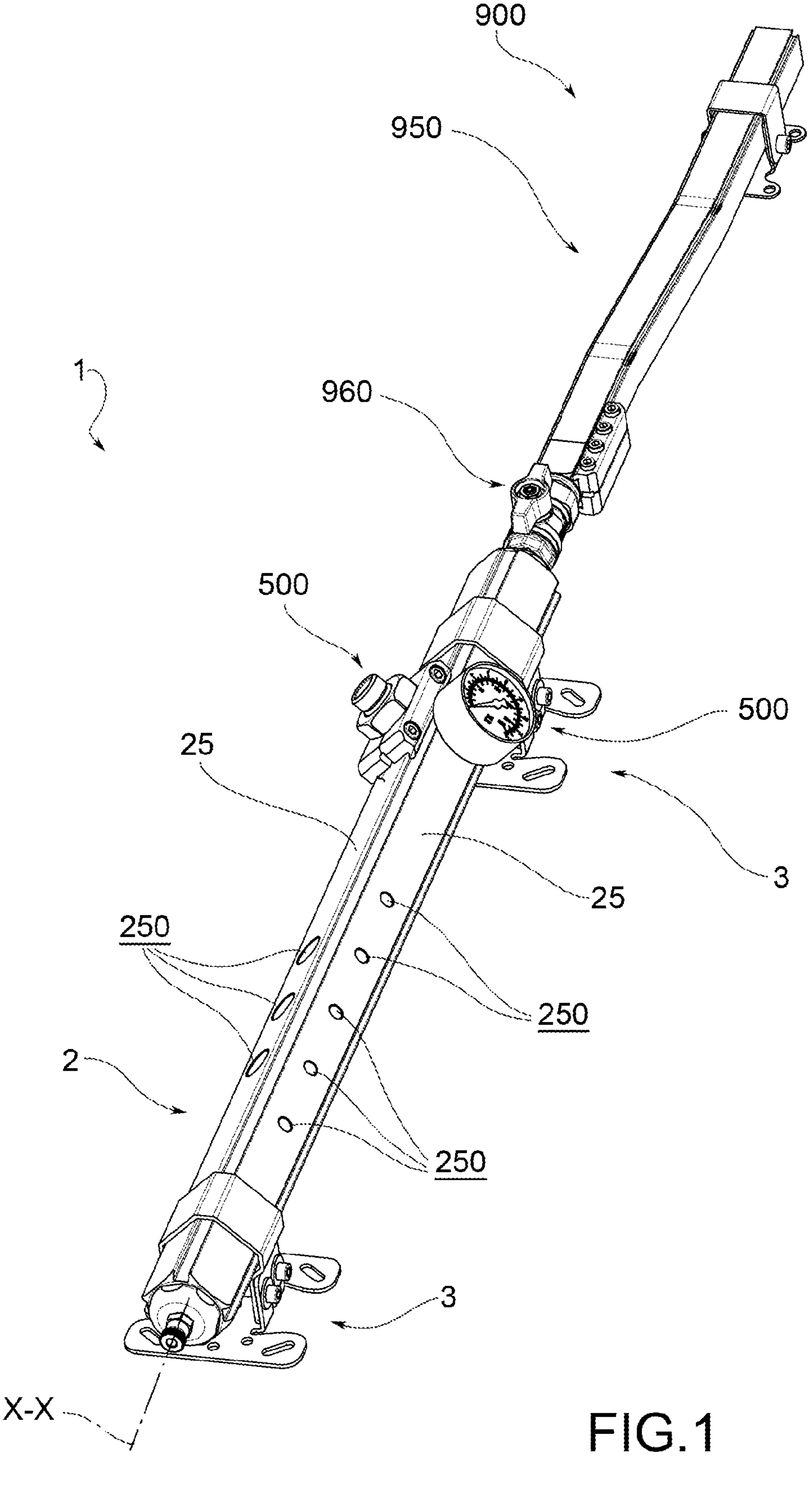
FIG. 1 is a perspective view of a portion of a connection and fluidic distribution system comprising an operative connection device according to the present invention.
Figure 2:
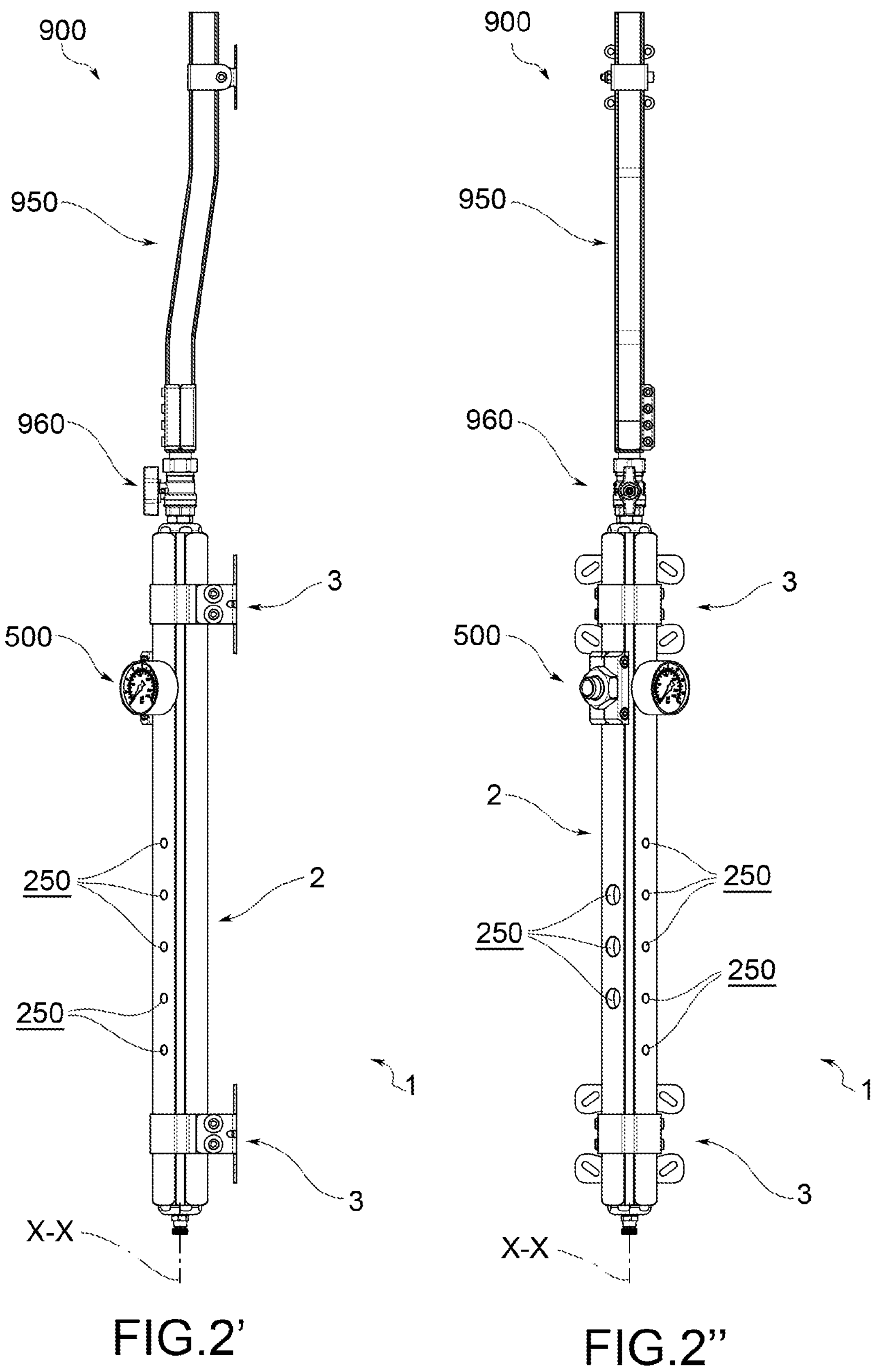
FIGS. 2' and 2" show two orthogonal views, respectively lateral and frontal, of the connection and fluidic distribution system in FIG. 1.
Figure 3:
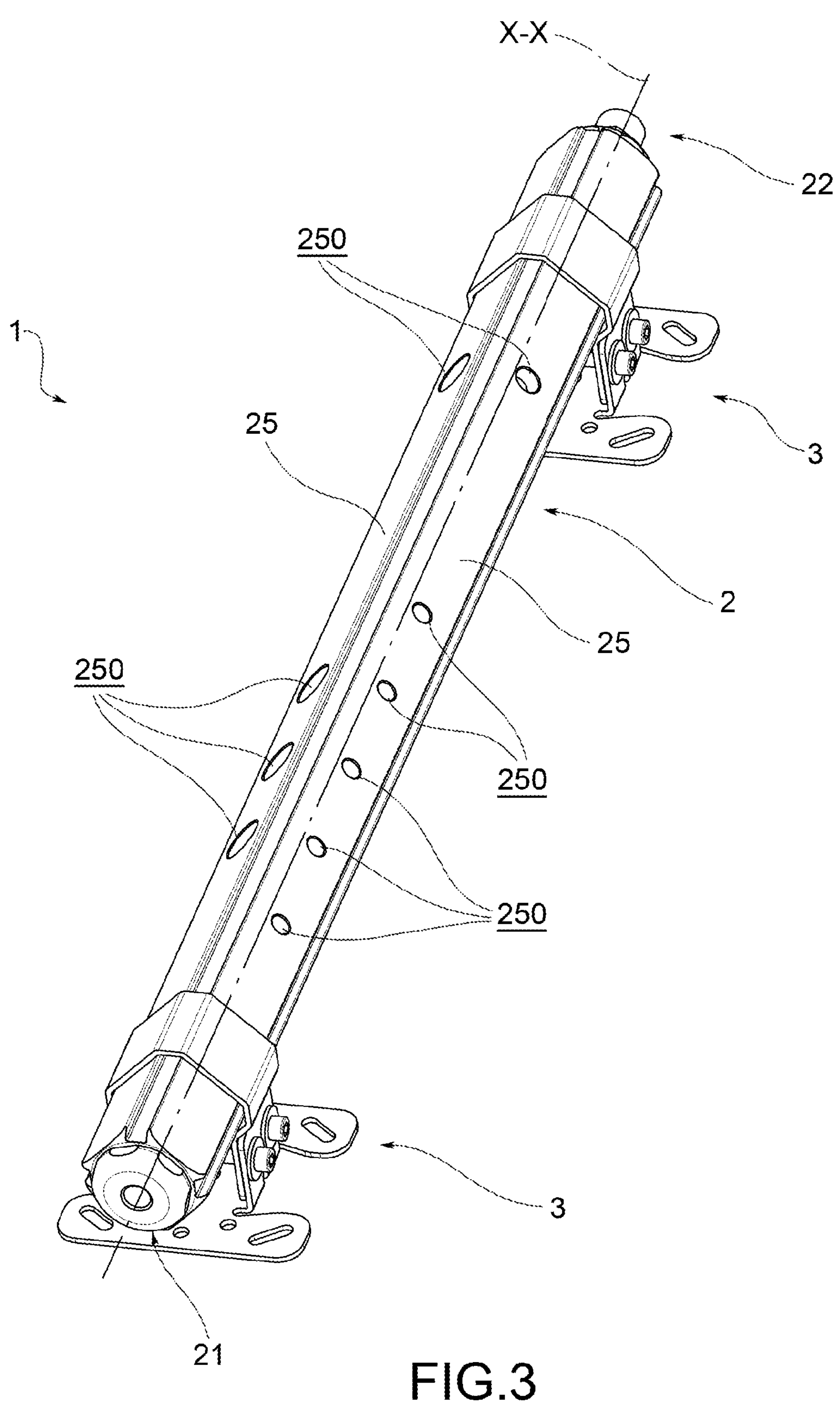
FIGS. 3 and **3*a*** show a perspective view and a perspective view with separate parts, respectively, of an operative connection device according to the present invention, according to a preferred embodiment.
Figure 3A:
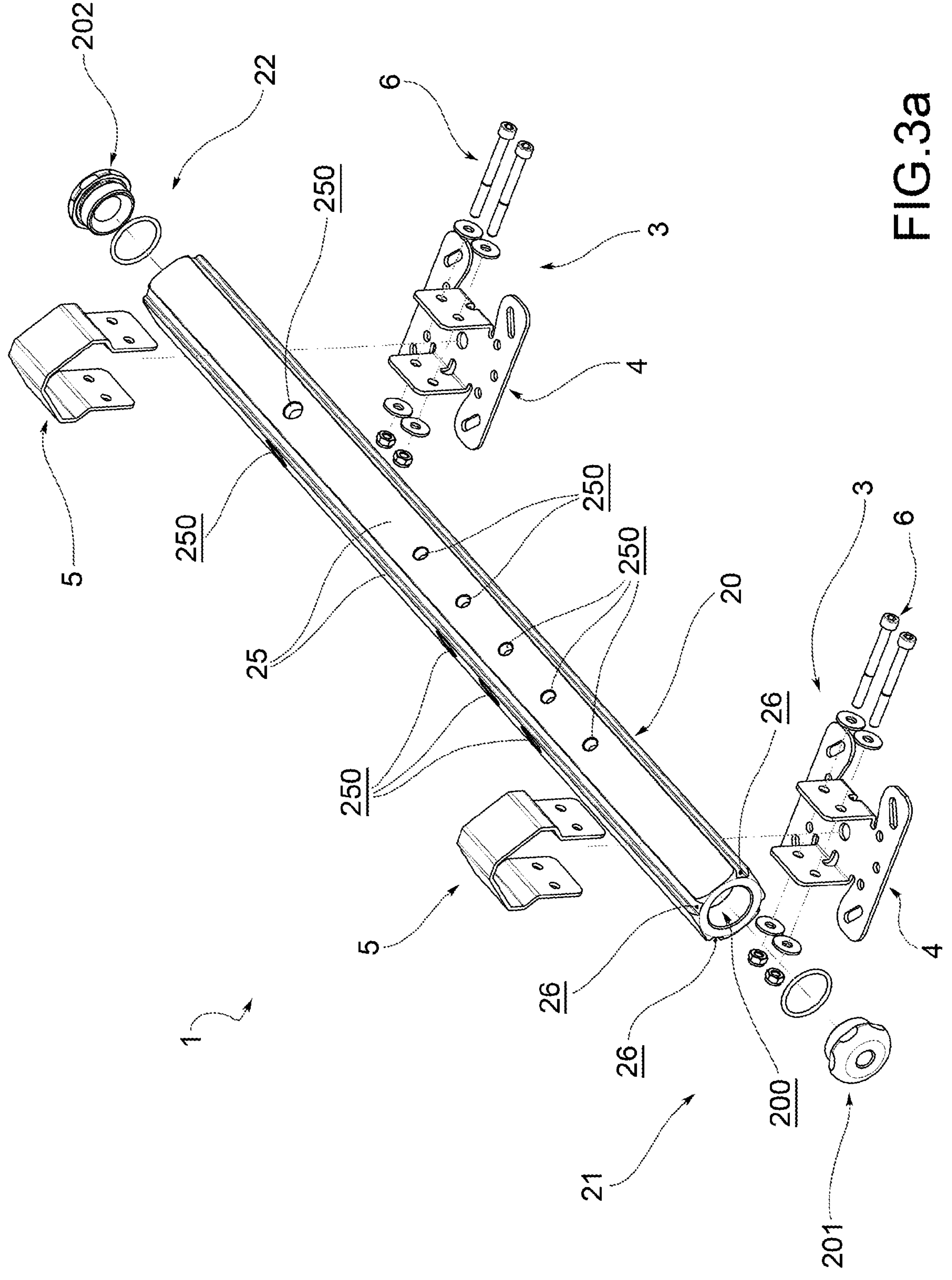
Figure 4:
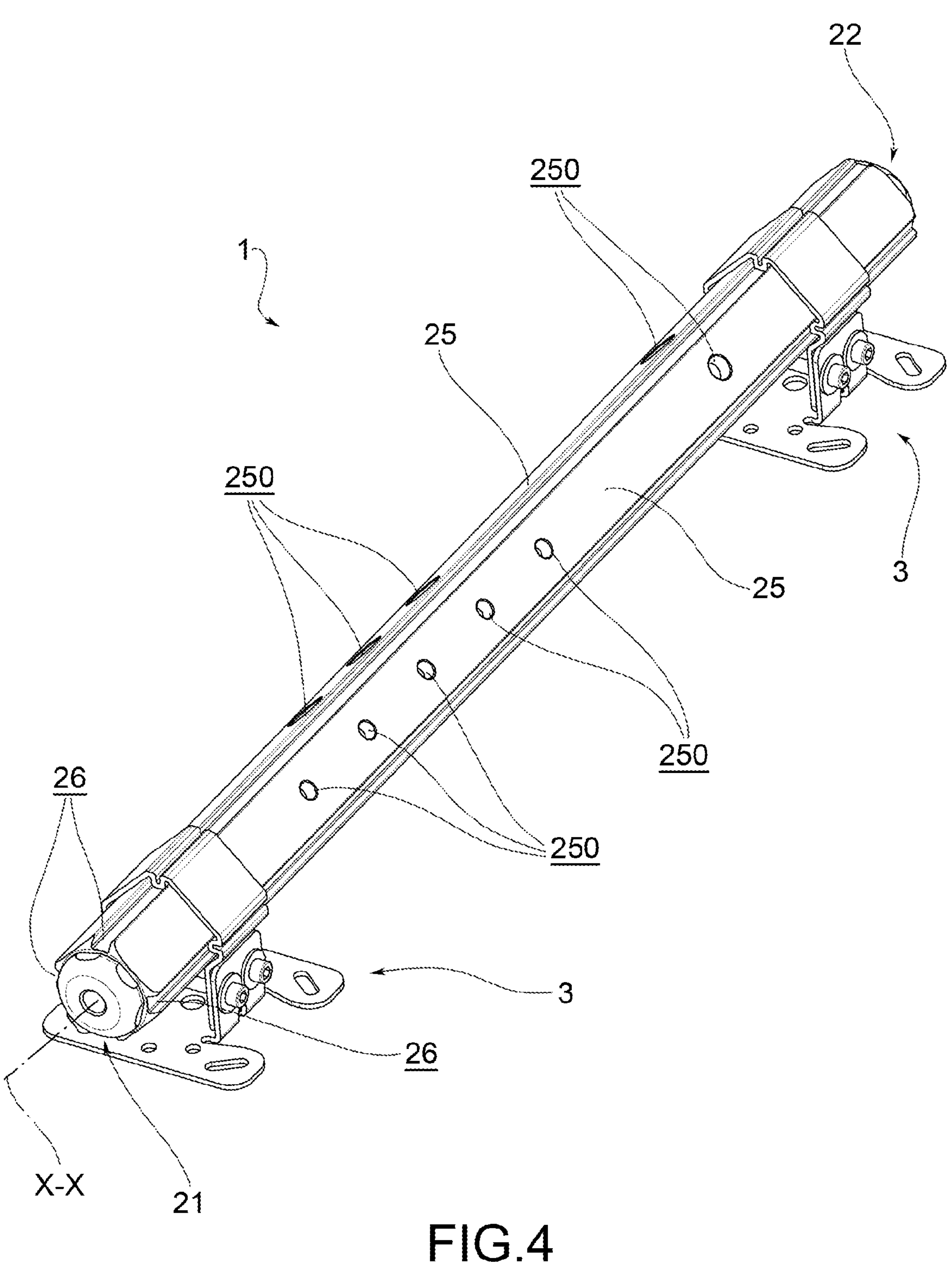
FIGS. 4 and **4*a*** show a perspective view and a perspective view with separate parts, respectively, of an operative connection device according to the present invention, according to a further preferred embodiment.
Figure 4A:
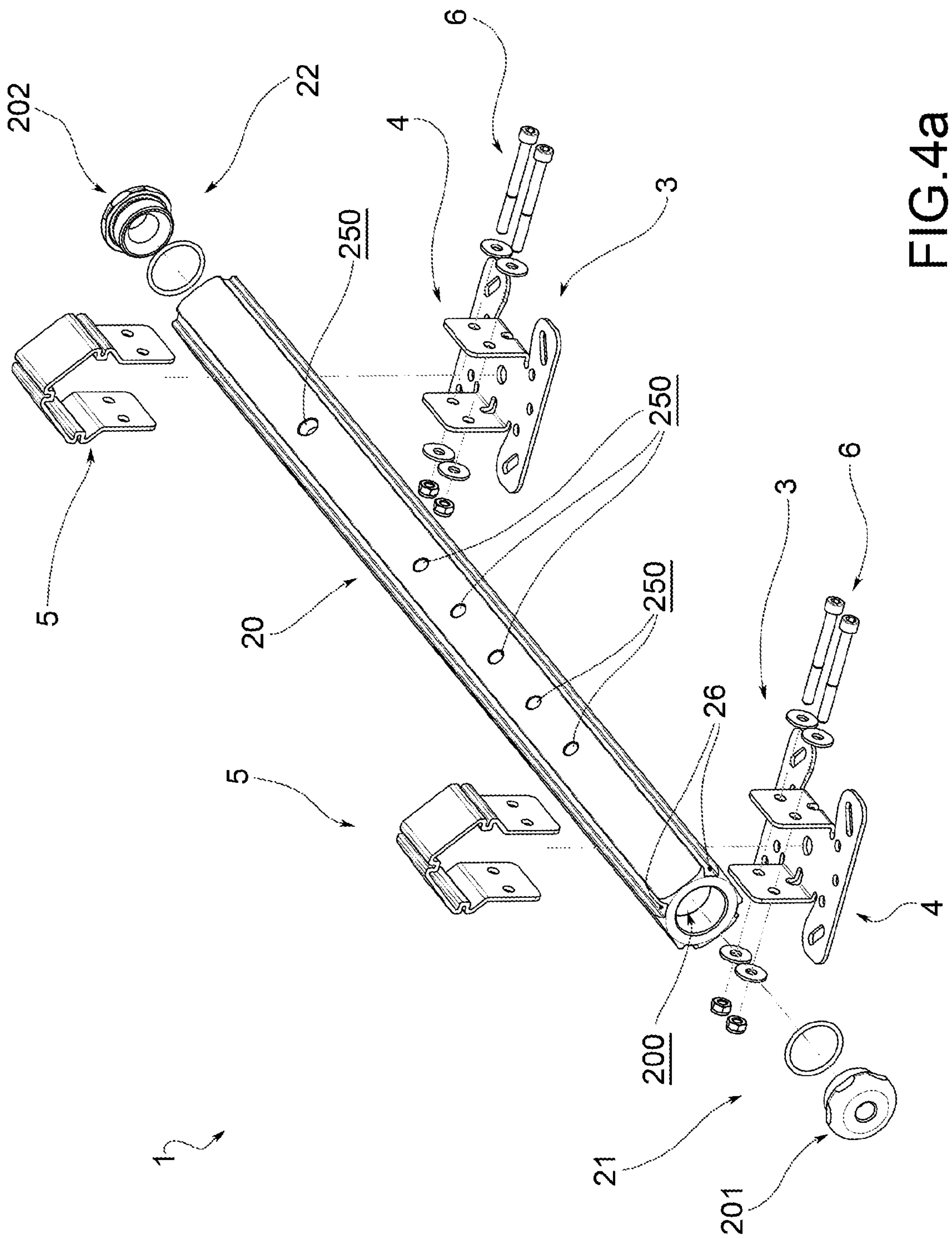
Figure 5:
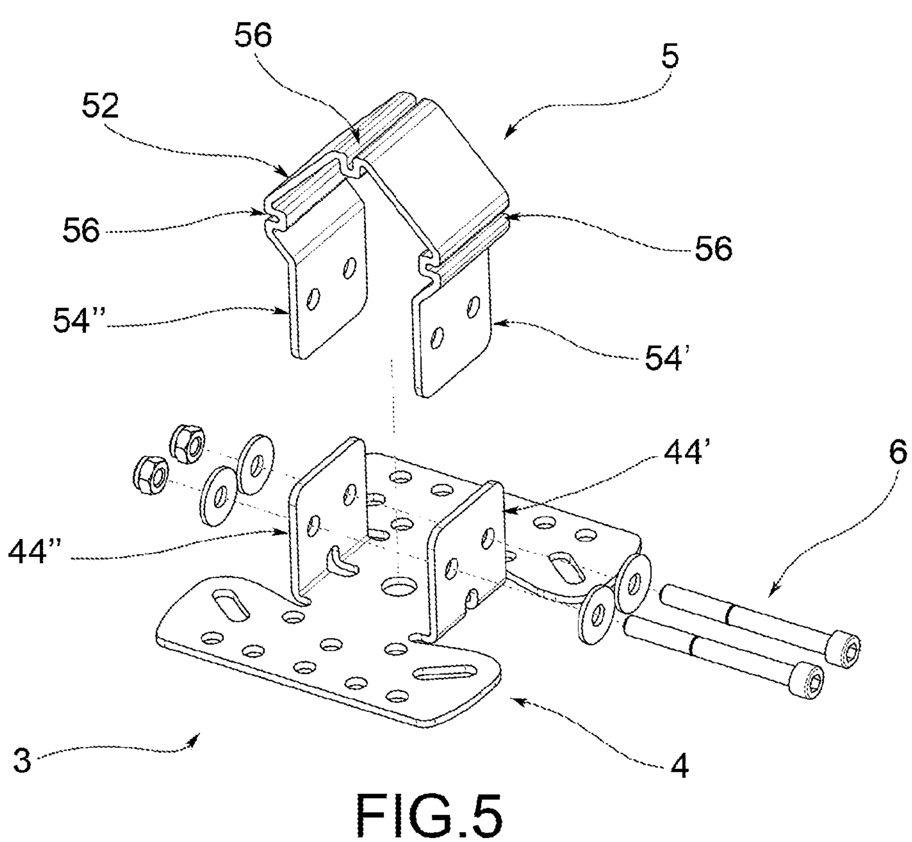
FIG. 5 shows a perspective view of separate parts of a bracket element of the operative connection device according to a preferred embodiment.
Figure 6:
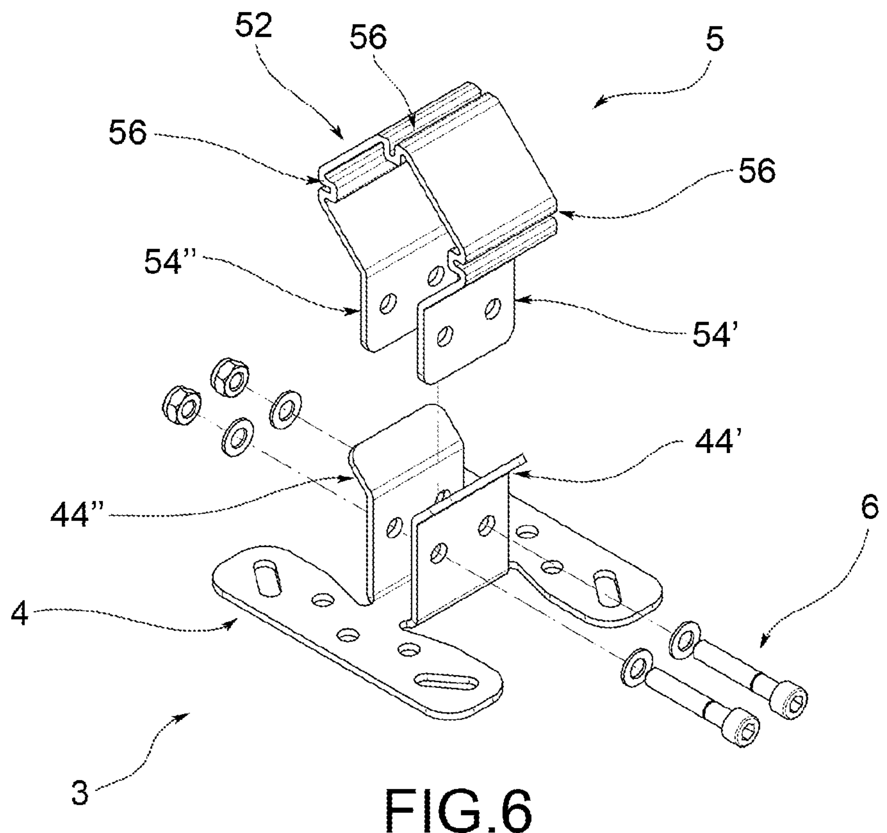
FIG. 6 shows a perspective view of separate parts of a bracket element of the operative connection device according to a further preferred embodiment.

In the above drawings, the reference numeral 1 denotes an operative connection device 1 as a whole according to the present invention.

The operative connection device 1 is suitable for being part of a connection and fluidic distribution system 900.

Said connection and fluidic distribution system 900 comprises one or more rigid channels 950.

Preferably, furthermore, said connection and distribution system comprises specific connecting elements 960, suitable for connecting two consecutive rigid channel elements.

Preferably, said connecting elements 960 also comprise valve members and control levers or handles.

Preferably, the type, dimensions and characteristics of the connecting means do not limit the present invention.

According to a preferred embodiment, the connection and fluidic distribution system 900 is suitable for implementing a ring structure, or an in-line structure.

According to the present invention, the operative connection device 1 extends along an X-X axis.

According to the present invention, said axis X-X extends substantially parallel to the vertical axis of the environment of the operative connection device 1. In other words, it extends along the support wall whereon it is mounted. Preferably, in this way a “dropper” is obtained. Preferably, the operative connection device 1 is the end portion of the “dropper”.

Preferably, the term “support wall” refers to a surface that extends substantially vertically and that is suitable for providing support to the operative connection device 1. Preferably, the support wall is the masonry wall of an environment. Preferably, the support wall is a surface of a machine or is a surface of a structure or the surface of a structural profile.

According to the present invention, the operative connection device 1 comprises a rigid channel element 2 and at least one bracket element 3.

According to the present invention, the rigid channel element 2 extends along the axis X-X.

The rigid channel element 2 extends between a coupling end 21 and a working end 22.

According to the present invention, the coupling end 21 is engageable with a rigid channel 950. Preferably, the coupling end 21 is engageable with a rigid channel 950 by a connecting element 960.

According to a preferred embodiment, the working end 22 is engageable with one or more working means, for example a pneumatically operated instrument.

Furthermore, the rigid channel element 2 has a square section comprising four longitudinal surfaces 25.

Said longitudinal surfaces 25 comprise operative holes 250 engageable by working means 500. Preferably, the term working means refers to pressure measurement instruments, or pneumatically operated instruments, without any particular limitation. For example, the term working means 500 also refers to the specific components of a machine. For example, the term working means 500 refers to connection components engageable by specific instruments.

According to a preferred embodiment, said operative holes 250 are threaded holes.

The type, location and size of the operative holes 250 do not limit the present invention.

According to a preferred embodiment, the rigid channel element 2 comprises a body 20 made of a metal material, preferably obtained by extrusion.

Preferably, said body 20 has the same shape as the rigid channels 950 comprised in the connection and fluidic distribution system 900.

According to a preferred embodiment, the rigid channel element 2 comprises end caps 201, 202 at the coupling end 21 and at the working end 22. Preferably, the end caps 201, 202 sealingly engage the body 20.

Preferably, the body 20 and the end caps 201, 202 define an inner chamber 200. Said inner chamber 200 comprises pressurized air.

According to a preferred embodiment, said end caps are fluidically connectable with other components, for example the connecting elements 960 or the working means 500 or the pneumatically operated instruments.

According to a preferred embodiment, the rigid channel element 2, at each corner region comprised between two longitudinal surfaces 25, comprises a groove 26.

Preferably, said groove 26 is usable for the attachment of working means 500, according to what is described above.

Preferably, each groove 26 is dovetailed.

Again, it is pointed out how, preferably, said body 20 has the same shape, including the presence of the grooves 26, as the rigid channels 950 comprised within the connection and fluidic distribution system 900.

According to the present invention, the at least one bracket element 3 is suitable for engaging the rigid channel element 2 in order to fix it to a support wall. In other words, the bracket element 3 is suitable for providing a fixed support, mountable to the support wall, for the rigid channel element 2.

According to the present invention, the bracket element 3 comprises a base member 4 engageable with the support wall and a gripping member 5 engaging the base member 4 and suitable for surrounding the rigid channel element 2, preferably the body 20.

The gripping member 5 comprises two member ends 54', 54" engageable with the base 4, and a housing region 52 extending about the axis X-X in which the rigid channeling element 2 is accommodated.

Furthermore, the gripping member 5 is shaped so that the housing region 52 has a substantially complementary shape to the square section of the rigid channel element 2.

In other words, the gripping member 5 is shaped so that the housing region 52 is shaped in such a way that it extends about the axis X-X for a perimeter portion of the body 20.

Again in other words, the gripping member 5 is shaped so that the housing region 52 has a substantially annular shape.

In addition, the gripping member 5 is shaped so that two longitudinal surfaces 25 are positioned facing the support wall while two longitudinal surfaces 25 are positioned facing the environment, so as to be equally accessible.

In other words, the gripping member 5 is shaped in such a way that a corner comprised between two longitudinal surfaces 25 is proximal to the support wall, while another corner comprised between two longitudinal surfaces 25 is distal from the support wall; the other two edges are at an intermediate distance from the support wall with respect to the aforementioned edges.

Preferably, the bracket element 3 is shaped so as to keep the rigid channel element 2 at a predefined distance from the support wall. Preferably, the longitudinal surfaces 25 facing the support wall are also engageable by working means 500.

According to a preferred embodiment, the operative connection device 1 comprises at least two bracket elements 3 axially spaced along the X-X axis.

Preferably, one bracket element 3 is positioned proximal to the coupling end 21 while the other bracket element 3 is positioned proximal to the working end 22.

According to a preferred embodiment, the base member 4 comprises two engagement portions 44', 44" extending in height, being engageable by the member ends 54', 54", respectively.

According to a preferred embodiment, the base member 4 comprises a planar base suitable for engaging the support wall. Preferably, the two engagement portions 44', 44" extend from said planar base.

Preferably, the two engagement portions 44', 44" transversely face each other and are mutually tightenable along with the member ends 54', 54" by tightening means 6.

Preferably, said tightening means 6 comprise screw/bolt elements.

Preferably, the tightening of the tightening means 6 forces reciprocal clamping, that is in the transverse direction, between the two engagement portions 44', 44" and therefore between the two member ends 54', 54".

According to a preferred embodiment, said clamping also performs a tightening action on the rigid channel element 2, discharging the action onto the longitudinal surfaces 25.

In other words, the tightening action by means of the tightening means 6 involves a clamping action of the housing region 52 on the rigid channel element 2, preferably on the longitudinal surfaces 25, preferably on all four longitudinal surfaces 25.

According to a preferred embodiment, the bracket element 3, in particular the base member 4 and the gripping member 5, is made of metal, preferably in a material chosen from metal alloys, for example aluminum.

According to a preferred embodiment, the gripping member 5 is obtained using specially shaped or worked metal, for example from a sheet of metal material and/or from a strip of metal material.

According to a preferred embodiment, the gripping member 5 is obtained using a specially extruded metal.

According to a preferred embodiment, the gripping member 5, preferably the housing region 52, is shaped in such a way to comprise at least one projection 56 suitable for being accommodated in a respective dovetail groove 26.

Preferably, the gripping member 5, preferably the housing region 52, is shaped comprising at least three projections 56 suitable for being accommodated in a respective groove 26.

Preferably, the tightening action is also suitable for discharging the action within said grooves 26.

Innovatively, the operative connection device is suitable for solving the problems of the prior art while continuing to meet the requirements of the field of application.

Advantageously, in fact, the operative connection device positions the rigid channel element in a position, with respect to the support wall, which allows for simple and safe access to the operative holes.

Advantageously, two longitudinal surfaces face entirely towards the environment.

Advantageously, the two longitudinal surfaces are accessible in the same manner.

Advantageously, the channel element has a plurality of simply accessed regions whereon pneumatically powered instruments are to be mounted: the working end and the two longitudinal surfaces all have simple and ample access.

Advantageously, the two longitudinal surfaces facing the support wall are exploitable.

Advantageously, the positioning of the rigid channel element is solidly engaged with the support wall.

Advantageously, the bracket performs a clamping action on the rigid channel element, discharging the securing action onto the longitudinal surfaces, and possibly within the grooves.

To the embodiments of the connection system that is the object of the present invention, a person skilled in the art, in order to meet specific requirements, could make variations or replace elements with functionally equivalent ones. These variants are also contained within the scope of protection as defined by the following claims.

Moreover, each variant described as belonging to a possible embodiment is implementable independently of the other variants described.

It is clear that a person skilled in the art may make changes to the invention in order to meet contingent requirements, all of said changes falling within the scope of protection as defined within the following claims.

The invention claimed is:

1. An operative connection device of a connection and fluidic distribution system comprising one or more rigid channels, mutually fluidically connected, through which air flows, the operative connection device extending along an axis and comprising:

a rigid channel element extending along the axis between a coupling end engageable with one of the one or more rigid channels, and a working end, wherein the rigid channel element has a square section, the rigid channel element comprising four longitudinal surfaces comprising operative holes that are engageable by working means; and at least one bracket element suitable for engaging the rigid channel element and securing the rigid channel element to a support wall, the at least one bracket element comprising:

a base member engageable with the support wall; and a gripping member comprising two member ends engaged with the base member, and a housing region extending about the axis in which the rigid channel element is accommodated;

wherein the gripping member is shaped so that the housing region has a substantially complementary shape to the square section of the rigid channel element and so that two of the four longitudinal surfaces are positioned facing the support wall, and the other two of the four longitudinal surfaces are positioned facing an environment.

2. The operative connection device of claim 1, comprising at least two bracket elements axially spaced apart along the axis.

3. The operative connection device of claim 1, wherein the base member comprises two engagement portions extending in height, being engageable by the two member ends, respectively.

4. The operative connection device of claim 3, wherein the two engagement portions transversely face each other and are mutually tightenable along with the two member ends by tightening means, so as to be transversely brought together.

5. The operative connection device of claim 4, wherein a tightening action by the tightening means involves a clamping action of the housing region on the rigid channel element.

6. The operative connection device of claim 4, wherein the tightening means comprises one or more screws or bolts.

7. The operative connection device of claim 4, wherein a tightening action by the tightening means involves a clamping action of the housing region on the longitudinal surfaces of the rigid channel element.

8. The operative connection device of claim 1, wherein the bracket element is made of metal.

9. The operative connection device of claim 1, wherein the rigid channel element comprises a body made of a metal material, and end caps at the coupling end and the working end, and wherein the body and the end caps define an inner chamber.

10. The operative connection device of claim 9, wherein the body is obtained by extrusion.

11. The operative connection device of claim 1, wherein the rigid channel element at each edge region between two longitudinal surfaces comprises grooves usable for securing the working means.

12. The operative connection device of claim 11, wherein the grooves are dovetailed.

13. The operative connection device of claim 11, wherein the gripping member is shaped so as to comprise at least one projection suitable for being accommodated in a respective groove.

14. The operative connection device of claim 11, wherein the housing region is shaped so as to comprise at least one projection suitable for being accommodated in a respective groove.

15. The operative connection device of claim 11, wherein the gripping member is shaped so as to comprise at least three projections suitable for being accommodated in respective grooves.

16. The operative connection device of claim 11, wherein the housing region is shaped so as to comprise at least three projections suitable for being accommodated in respective grooves.

17. The operative connection device of claim 1, wherein the base member and the gripping member are made of metal.

18. The operative connection device of claim 1, wherein the bracket element is made of a material selected from metal alloys.

19. The operative connection device of claim 1, wherein the base member and the gripping member are made of a material selected from metal alloys.

* * * * *